United States Patent [19]

Cloutier

[11] Patent Number: 5,027,140
[45] Date of Patent: Jun. 25, 1991

[54] MAGNETIC RECORDING ON FILM OF SERIES SCENE INDICATION BY A CAMERA FOR USE BY A PHOTOFINISHER

[75] Inventor: Robert P. Cloutier, Spencerport, N.Y.

[73] Assignee: Eastman Kodak Company, Rochester, N.Y.

[21] Appl. No.: 582,284

[22] Filed: Sep. 5, 1990

Related U.S. Application Data

[62] Division of Ser. No. 405,505, Sep. 11, 1990, Pat. No. 4,907,439.

[51] Int. Cl.$^5$ .................. G03B 29/00; G03B 17/24
[52] U.S. Cl. ................................ 354/76; 354/106
[58] Field of Search ................ 354/76, 105-109, 354/75

[56] References Cited

U.S. PATENT DOCUMENTS

| | | | |
|---|---|---|---|
| 3,873,213 | 3/1975 | Plumadorf | 355/41 X |
| 4,079,388 | 3/1978 | Takahama et al. | 355/41 X |
| 4,574,319 | 3/1986 | Konishi | 358/335 |
| 4,702,580 | 10/1987 | Denner | 354/106 |

*Primary Examiner*—Michael L. Gellner
*Assistant Examiner*—Jae N. Noh
*Attorney, Agent, or Firm*—Francis H. Boos, Jr.

[57] ABSTRACT

A series scene indication is magnetically recorded adjacent appropriate frames in a strip of film by an autowind camera whenever it is in rapidfire mode. The camera includes a magnetic head positioned to record data in a magnetic layer of the film strip as the strip is transported by a take-up reel, and a processor which intelligently senses when the camera is in a rapidfire mode and instructs recording electronics to energize the magnetic head in order to record the series scene indication on the film strip.

3 Claims, 3 Drawing Sheets

MAGNETIC RECORDING ON FILM OF SERIES SCENE INDICATION BY A CAMERA FOR USE BY A PHOTOFINISHER This is a divisional of application Ser. No. 405,505, filed Sep. 11, 1990 now U.S. Pat. No. 4,987,439.

TECHNICAL FIELD

This invention is related to the field of photography and more particularly to the recording of scene parameters magnetically on film on a frame-by-frame basis.

BACKGROUND OF THE INVENTION

The advantages of recording scene parameters on film contemporaneously with each exposure are well understood. For example, U.S. Pat. No. 4,702,580 teaches the recording on film of an indication that a group of frames thereon are related to the same scene. Such an indicator is readily used by the photofinisher to justify applying the same print exposure conditions to all of the film frames in the group, thereby keeping the scenes uniform in the prints returned back to the customer.

One disadvantage of the foregoing technique is that the series scene indication thus recorded on the film may not necessarily be reliable enough for a photofinisher to rely upon. For example, if it is the camera user himself who is to manually activate the means for recording the series scene indication on the film, the reliability of such an indication is limited by the skill of the camera user. Another disadvantage is that this type of technique is typically taught in connection with an optical recording technique using bar codes and the like. Thus, while the film itself serves as a memory in which to store the series scene indication, the film is merely a read-only memory following its development, when the series scene indication becomes readable. Accordingly, if any related information is to be stored by the photofinisher, he cannot use the film to do so.

Therefore, a problem which needs to be solved is how to record a series scene indication on film in the camera in a reliable manner such that a photofinisher can rely on such an indication in nearly all instances for selecting the scenes bearing such a series scene indication for printing with uniform print exposure conditions. Another problem is how to record series scene indications using the film as a memory in such a manner that the film remains useful as a memory in which further information related to the series scene indication may be stored as well as retrieved on the film by the photofinisher following development of the film. A third problem to be solved is how to record on the film a series scene indication for each frame wherever appropriate in such a manner that the indication is unambiguously associated with the corresponding film frame and readily acccessible to a photofinisher.

SUMMARY OF THE INVENTION

The foregoing problems are solved in the present invention, which is a system including a film having a magnetic layer, a camera having a magnetic recording device and a photofinishing system having a magnetic record and playback device. The camera recording device includes a processor connected to the camera shutter button and to a circuit which synchronizes the camera shutter and the autowind motor. The magnetic recording and playback device in the photofinishing system includes a processor connected to a film scanner and to an exposure adjustable print exposure source.

In the camera, the synchronization circuit synchronizes the actuation of the camera shutter and the film autowind motor, so that each time the shutter is opened and then closed, the autowind motor rotates the take-up spool in the camera so that the film is transported until the next frame is adjacent the camera shutter. The shutter release button controls the operation of the synchronization circuit.

In operation, the processor intelligently senses whether the camera is in rapid fire mode. In this mode, the shutter button is held down continuously so that the synchronization circuit causes the shutter to open and close a number of times in quick sequence as the autowind motor rapidly moves successive frames past the shutter, stopping the film briefly during each exposure for the time required. For each frame in which the processor senses this to be the case, the processor instructs recording electronics to energize the camera's magnetic head each time the film is transported by the take-up reel by one frame, so that a predetermined code indicating a series scene is recorded by the magnetic head in a magnetic track lying within or adjacent the current film frame. The magnetic track preferably extends longitudinally along one edge of the film adjacent the individual frame, the track starting and stopping within a length spanned by the frame. The magnetic track in which the series scene indication code is recorded may be particularly dedicated to the recording of scene indications such as the series scene indication discussed here.

In the photofinishing system, a processor is connected to receive data from an automatic film scanner and to transmit commands to an exposure adjustable print exposure source. As each frame in the developed film is positioned adjacent the film scanner, the film scanner determines the pixel density for each one of three primary colors (e.g., red, green and blue) as well as the pixel density for luminance or gray.

Using techniques well-known in the art, the photofinishing system processor computes from the color density data the optimum exposure values for gray and the three primary colors which are optimum for that particular frame. The processor then sends color adjustment commands to the color adjustable print exposure source. A frame on a photosensitive print paper is then exposed to the current film frame by the color adjustable print exposure source in accordance with the color adjustment signals transmitted by the processor.

In the invention, the photofinishing processor is also connected to magnetic record and playback electronics controlling a magnetic head positioned to read and record in previously recorded tracks on the film, such as the magnetic tracks recorded by the camera described above. The processor monitors the magnetic data read out by the magnetic head to determine whether a series scene indication was recorded for any particular frame on the film. If it was, the processor at first does not compute the optimum primary color exposure values for that frame. Instead, the processor postpones this step and instead compares the data obtained from the film scanner with the same type of data obtained for previous frames on the film. Unless there is a large deviation between such data, the processor then assumes that the series scene indication is valid with respect to the Present frame and that the print exposure primary color values previously computed for a given one of the earlier frames in the series may be validly applied to the current frame. Accordingly, the processor, which has stored the previously computed exposure values, retrieves these values from storage and transmits them to the print exposure source for exposing of the current frame. On the other hand, if the scanning data obtained for the current frame deviates from the scanning data obtained for previous frames in the current series scene group of frames, the processor then assumes that this particular frame deviates from the series scene group, so that its optimum exposure values need to be computed individually instead of using the exposure values stored for the group of series scenes of which the current frame is a member. An example of this might be a group of series scenes shot in rapid fire sequence by the camera, during one frame of which a lightning strike occurs.

In one embodiment of the invention, the processor always stores the latest set of film scanning data and print color exposure values computed therefrom for use in subsequent frames in the event a series scene indicator code is sensed by the magnetic head. In one embodiment, this memory is simply a semiconductor memory connected to the processor. In another embodiment of the invention, this memory is the magnetic layer in the film, the data otherwise recorded in memory being recorded instead by the photofinisher magnetic head in a dedicated magnetic track on the film. In this embodiment, as the photofinisher inspects each frame, it magnetically records the scanning data as well as the print exposure values computed therefrom, so that in any given frame the magnetic track may include the following data: a series scene indication, film scanning data, and optimum print exposure values for the primary colors and gray. In accordance with the foregoing description, only the first frame in a group of frames bearing successive series scene indications will have print exposure values recorded in its magnetic track(s).

DESCRIPTION OF THE DRAWINGS

The invention is best understood by reference to the accompanying drawings, of which.

DETAILED DESCRIPTION OF THE INVENTION

Figure 1:
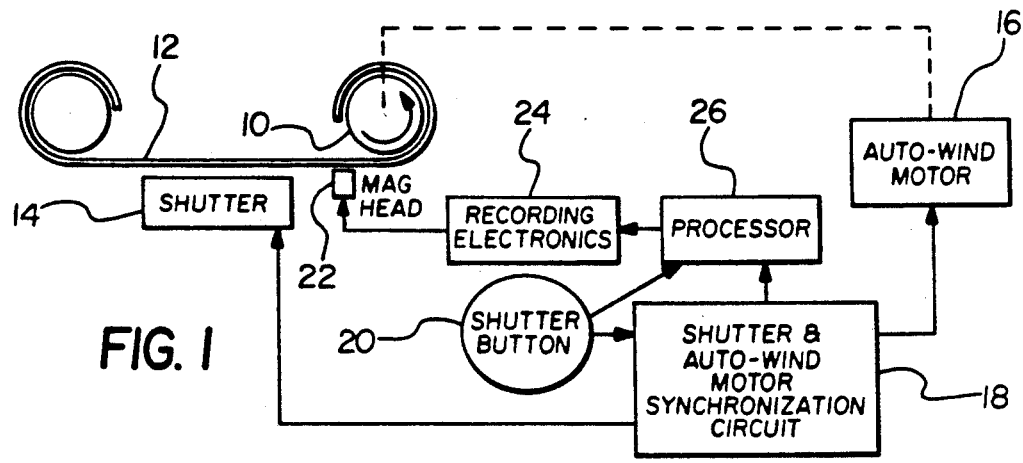
FIG. 1 is a simplified schematic block diagram illustrating a camera embodying one aspect of the invention.

Referring to FIG. 1, a camera embodying the invention includes a take-up reel 10 around which a length of film 12 is wound so as to be transported past a camera shutter 14. The take-up reel is actuated by an auto wind motor 16. Shutter and auto wind motor synchronization circuit 18 responds to a shutter release button 20 so that, whenever the camera user pushes the shutter button 20 down, the shutter 14 opens to a predetermined aperture size for a predetermined exposure time, and immediately at the end of the exposure, the auto wind motor 16 rotates the take-up reel 10 so that the film 12 is transported past the shutter by the pitch of one film frame. The invention includes a magnetic head 22 connected to recording electronics 24 controlled by a processor 26. The processor 26 responds to the activation of the shutter release button 20 and to the activation of the synchronization circuit 18.

Figure 2:
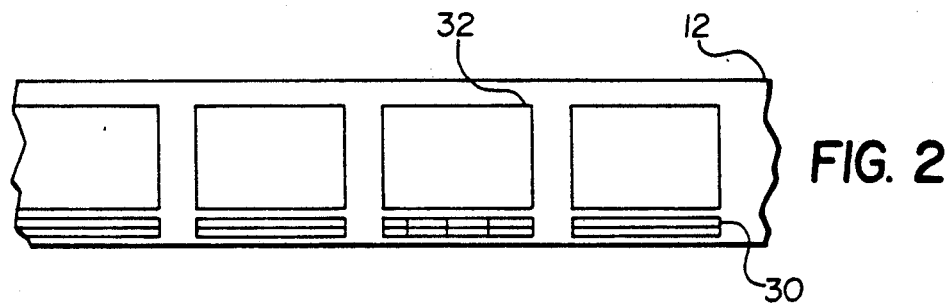
FIG. 2 is a plan view indicating the location of the parallel dedicated magnetic tracks with respect to the image frames on the film for use in the camera of FIG. 1.

The magnetic head 22 is controlled by the processor 26 through the recording electronics 24 so as to record in a magnetic track adjacent each frame on the film a series scene indication whenever the shutter button 20 is held down so that the synchronization circuit 18 operates the shutter 14 and the auto wind motor 16 in a rapidfire mode. The rapidfire mode occurs whenever the shutter button 20 is held down continuously over a number of frames or by the shutter button 20 being pushed rapidly up and down several times in rapid succession. FIG. 2 illustrates the magnetic tracks 30 adjacent each frame 32 of the strip of film 12. Each track 30 is longitudinal and parallel with the direction of the length of the film 12. There may be more than one track, FIG. 2 illustrating plural dedicated magnetic parallel tracks adjacent each frame 32. One of the tracks 30 is dedicated to the recording of a series scene indication.

Figure 4:
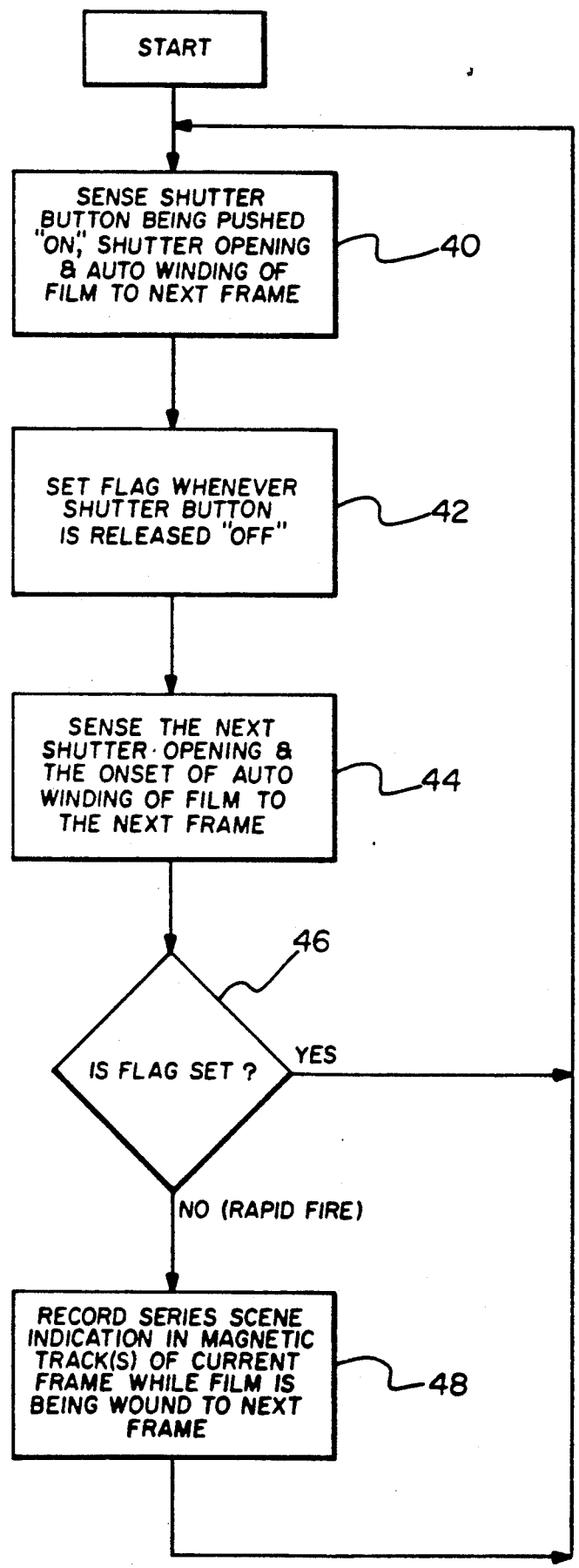
FIG. 4 is a flow chart illustrating the operation of the processor in the camera of FIG. 1.

The operation of the camera processor 26 is illustrated in FIG. 4. The algorithm illustrated in FIG. 4 is executed automatically by the processor 26 in accordance with instructions stored therein. First, the processor senses the shutter button 20 being pushed down or "on" and also senses the synchronization circuit actuating the shutter 14 and then actuating the auto wind motor 16. During the sequence, as soon as the shutter button 20 is released up or "off" for a minimum amount of time, the processor 26 sets an internal flag. This internal flag signifies that a rapidfire mode is not in effect with respect to the next picture frame. The processor 26 then senses the next time that the synchronization circuit 18 actuates the shutter 14 and then starts the onset of the auto winding of the film by the auto wind motor 16. At this point the processor 26 inquires whether the flag is set. If the flag is set, processor 26 returns to the initial state it was in at step 40 (the YES branch of block 46). On the other hand, if the flag is not set at this point (NO branch of block 46), the processor 26 concludes that the camera auto wind motor 16 and shutter 14 are operating in the rapidfire mode under the control of the synchronization circuit 18. Therefore, the processor 26 records a series scene indication as a coded symbol in a predetermined one of the dedicated magnetic tracks 30 on the film 12 as the film begins its movement to bring the next frame adjacent the shutter 14. A series scene indication signal is transmitted from the processor 26 to the recording electronics 24 where it is transformed to a channel encoded signal, transmitted to the magnetic heads 22 and recorded on the film 12. This being accomplished, the processor 26 returns to its original state at the beginning of step 40.

Figure 3:
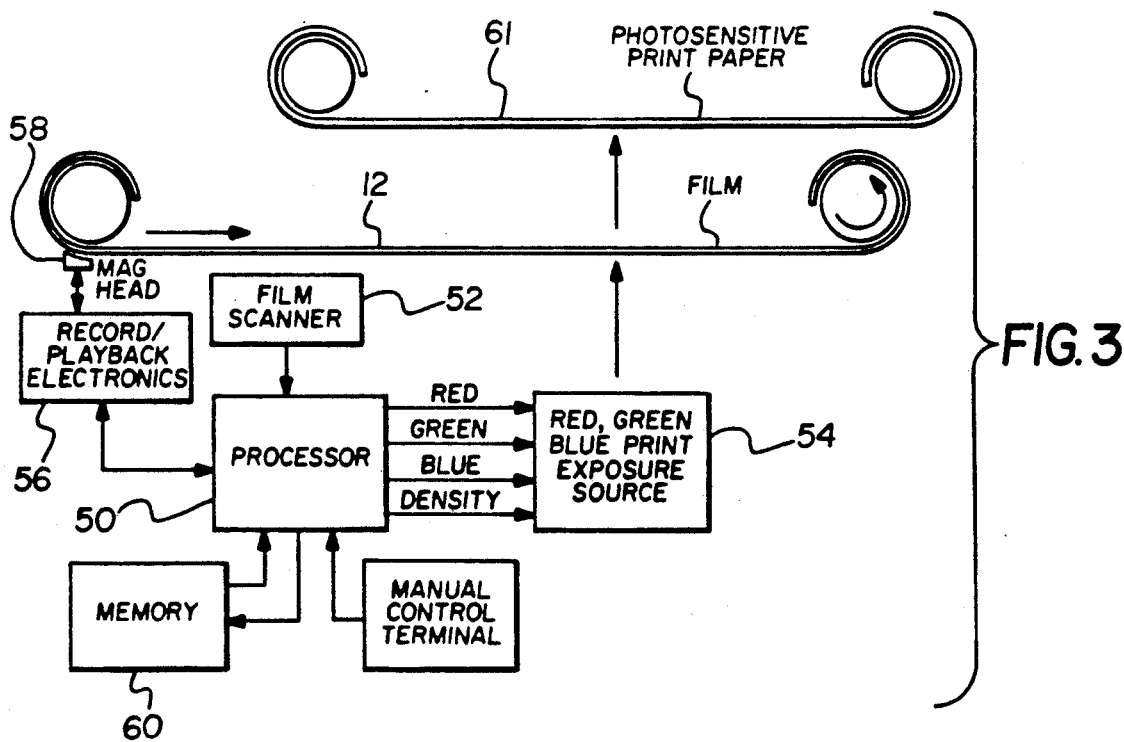
FIG. 3 is a simplified schematic block diagram illustrating a photofinishing system embodying another aspect of the invention.

Referring to FIG. 3, the photofinishing system of the invention includes a processor 50 which receives sensiometric data regarding each frame of the film 12 from a film scanner 52. The processor 50 also transmits exposure values for various predetermined colors to a print exposure source 54. In addition, the processor 50 is connected through a record/playback electronics 56 to a magnetic head 58 positioned to read and write data to or from magnetic tracks 30 in the film 12 as it is transported through the photofinishing system of FIG. 3.

Each frame 32 on the film 12 is first positioned adjacent the film scanner 52. The film scanner 52 measures the light intensity, and by inference the film pixel density, for each of three primary colors and gray in the film frame using a known light source transmitting light from the other side of the film. The processor 50 receives this photosensiometric data and, using well-known techniques computes the desired exposure values for a print to be made from that frame for the three primary colors and gray. Processor 50 then transmits commands to the exposure source 54, the commands signifying the amount of red, green, blue and gray exposure values for light to be transmitted through the current frame to a frame on a roll of photosensitive paper 61. The processor continually monitors the signals read by the magnetic head from the magnetic tracks 30 on the film 12 so as to be alerted whenever a series scene indication is present in the magnetic tracks adjacent one of the frames 32. If the processor 50 senses a series scene indication it immediately postpones computation of the optimum exposure values from the photosensiometric data sensed by the film scanner 50 in the current frame. Instead, the processor 50 compares the photosensiometric data sensed by the scanner 52 with the photosensiometric scanner data recorded measured from a previous frame and stored in a memory 60. If the processor 50 determines that there is no significant deviation between the current and previous photosensiometric scanning data the processor 50 retrieves from the memory 60 the print exposure values already computed from the previous photosensiometric scanning data stored in the memory 60, translates these values to commands which are then transmitted to the exposure source 54 and used to expose the next print on the paper 61 from the current frame on the film 12. For this purpose, the processor 50, in the absence of a series scene indication, always computes the optimum print exposure values from the photosensiometric data received from the film scanner 52 and automatically stores both the photosensiometric data and the optimum print exposure values in the memory 60 for possible use in printing subsequent frames. In the absence of a series scene indication recorded in the next frame, the current contents of the memory 60 is erased and replaced by the same type of information corresponding to the next frame in the film 12. This record and erase process is suspended as soon as a successive group of frames is encountered bearing the series scene indication code in their magnetic tracks. Then, the most recent print exposure value stored in the memory 60 is used to expose all of the frames in the series. The exception is individual frames in the series whose photosensiometric scanning data deviates significantly from that of the group in the series. For such a deviant frame, an individual set of print exposure values is computed from the photosensiometric data sensed for that frame, the print exposure values thus computed being used to print that frame only, the data stored in the memory 60 being used to print the rest of the frames in the series which do not deviate from the photosensiometric values of the group.

Figure 5:
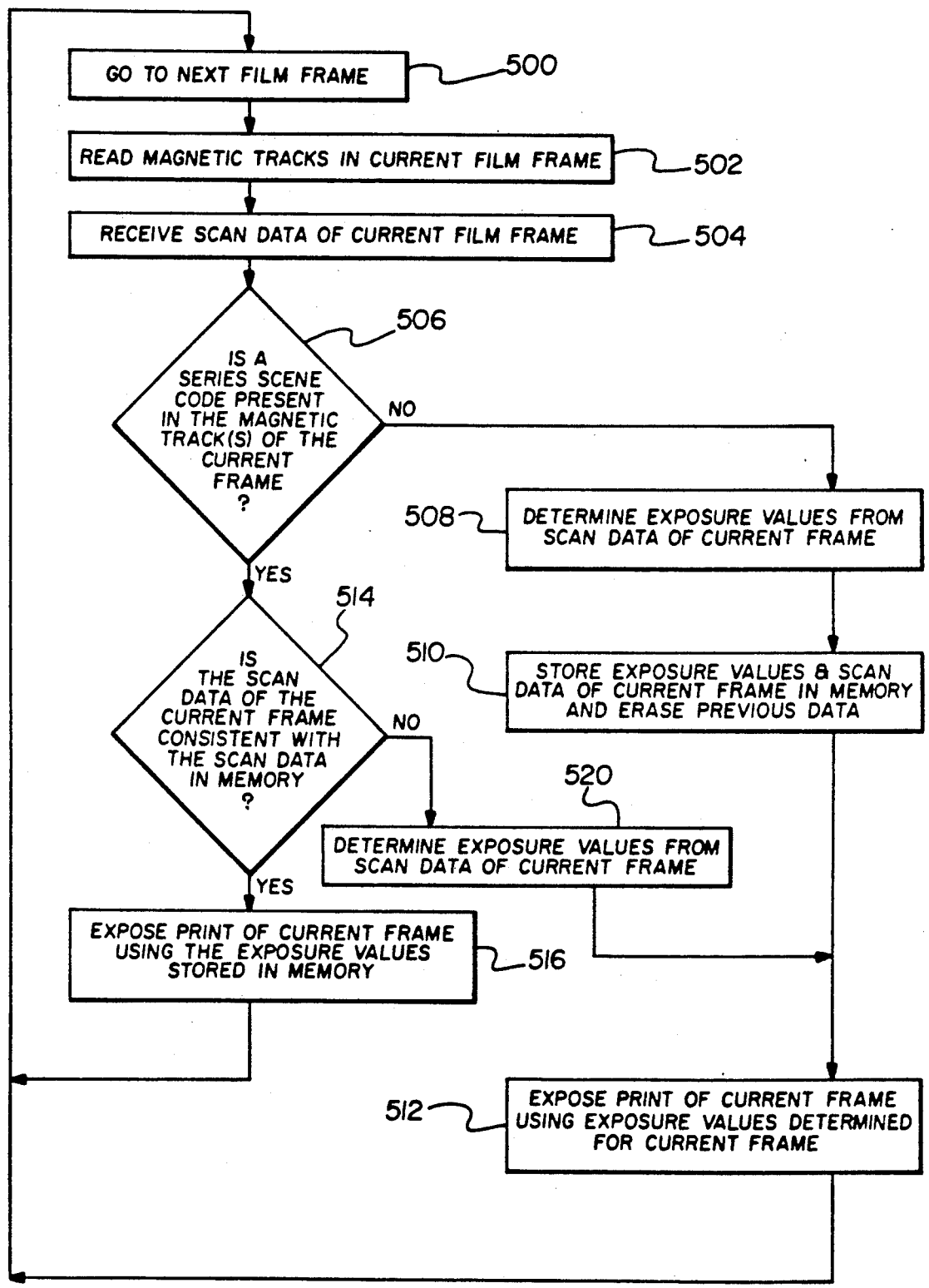
FIG. 5 is a flow chart illustrating the operation of the processor in the photofinishing system of FIG. 3.

This operation is best illustrated in FIG. 5. The film 12 is transported so that the next film frame therein is adjacent the scanner 52 (step 500). As the film is thus transported, the magnetic head 58 reads the magnetic tracks in that frame, the data being transmitted to the processor 50 (step 502). Then, the processor 50 receives the photosensiometric data for the current frame from the film scanner 52 (step 504). The processor 50 then determines whether a series scene code is present in the magnetic track or tracks of the present frame (block 506). If not, the processor 50 in step 508 determines the optimum print exposure values in the primary colors from the photosensiometric data sensed by the scanner 52 from the current film frame. The photosensiometric data and the optimum exposure values are stored by the processor 50 in the memory 60 and a previous such exposure values, photosensiometric data for previous frames being erased or flagged as no longer applicable. The exposure values thus determined in step 508 are used by the exposure source 54 to expose the current film frame (step 512). If, on the other hand, in step 506 the processor 50 determined that a series scene code was present in the magnetic tracks of the magnetic frame (YES branch of block 506), then the processor 50 determines whether the photosensiometric data of the current frame is consistent with the photosensiometric data for a previous frame last recorded in the memory 60. If so (YES branch of block 514), the processor retrieves the exposure values previously stored in the memory 60 and sends these as commands to the exposure source 54 so that the current frame is exposed using the exposure values previously stored in the memory 60 (block 516). Presumably, these values correspond to the first frame in a series of frames exposed in rapidfire sequence by the camera.

If the processor 50 determines that a significant deviation between the photosensiometric data stored in the memory 60 and the photosensiometric data sensed by the scanner 52 from the current film frame exists, then (taking the NO branch of block 514), the processor 50 determines the exposure values from the photosensiometric data of the current frame (block 520), notwithstanding that it has a series scene indication recorded on it. It then uses these currently computed exposure values to expose the current frame (block 512), as if no series scene indication had been recorded for that frame. However, the exposure values and photosensiometric data previously recorded in the memory 60 for an earlier frame are retained therein in case subsequent frames are members of the same series scene group and may be exposed using the exposure value of the first frame in the group.

Therefore, the processor 50 returns to its original state at the beginning of step 500 in preparation for the next film frame.

Of course, it is not necessary to use just the exposure value of the first frame in a group of series scene frames. Instead, one could use the first several frames in the series scene frame group to construct an average set of exposure values used for the entire group. Other alternative embodiments may be readily apparent to those skilled in the art. Accordingly, while the invention has been described in detail with specific reference to preferred embodiments thereof, it is understood that variations and modifications of the invention may be made without departing from the true spirit and scope of the invention.

What is claimed is:

1. In a camera which exposes film having a magnetic layer in the film, a shutter controlling the film exposure, an auto wind motor and take-up reel to automatically reposition the film with respect to the shutter and a shutter release button governing a synchronization circuit actuating both the shutter and the auto wind motor, the improvement comprising:

a magnetic head positioned to record data on the film as it is transported by said take-up reel, and a processor which senses whether said shutter button is operated such that said synchronization circuit is in a rapidfire mode wherein said auto wind motor and shutter are operated in a rapid alternating sequence, said processor including means for transmitting to said magnetic head a series scene indication code for recording in or near corresponding frames in said film in response to said synchronization circuit being in said rapidfire mode.

2. The improvement of claim 1 wherein said processor determines whether said synchronization circuit is in said rapidfire mode by sensing whether said shutter button is continuously on during successive actuations by said synchronization circuit of said shutter and said auto wind motor.

3. The improvement of claim 1 wherein said magnetic head records said series scene indication in a longitudinal magnetic track adjacent the corresponding frame in said film in a direction parallel to the length of said film.

* * * * *

UNITED STATES PATENT AND TRADEMARK OFFICE
CERTIFICATE OF CORRECTION

PATENT NO. : 5,027,140
DATED : June 25, 1991
INVENTOR(S) : Robert P. Cloutier

It is certified that error appears in the above-identified patent and that said Letters Patent is hereby corrected as shown below:

| | |
|---|---|
| Title Page | Title should read --CAMERA FOR MAGNETIC RECORDING ON FILM OF SERIES SCENE INDICATION |
| Title Page | Filed: "Sep. 5, 1990" should read --Sep. 15, 1990-- |
| Title Page | Related U.S. Appl. Data should read --Division of Ser. No. 405,505, Sep. 11, 1989, Pat. No. 4,987,439.-- |
| Col. 1, line 1 | Title should read --CAMERA FOR MAGNETIC RECORDING ON FILM OF SERIES SCENE INDICATION-- |
| Col. 1, line 7 | "1990" should read --1989-- |

Signed and Sealed this

Eighth Day of December, 1992

Attest:

DOUGLAS B. COMER

*Attesting Officer*   *Acting Commissioner of Patents and Trademarks*